United States Patent [19]

Nakamura

[11] Patent Number: 5,476,007
[45] Date of Patent: Dec. 19, 1995

[54] VIBRATING GYROSCOPE

[75] Inventor: Takeshi Nakamura, Nagaokakyo, Japan

[73] Assignee: Murata Manufacturing Co., Ltd., Kyoto, Japan

[21] Appl. No.: 142,920

[22] Filed: Oct. 29, 1993

[30] Foreign Application Priority Data

Nov. 4, 1992 [JP] Japan ................................. 4-321312

[51] Int. Cl.⁶ ........................................................ G01P 9/04
[52] U.S. Cl. ......................................................... 73/504.12
[58] Field of Search .............................. 73/505, 517 AV, 73/517 R, 517 B, 505

[56] References Cited

U.S. PATENT DOCUMENTS 3,739,202  6/1973  Cady ................................. 73/517 AV
5,166,571  11/1992  Konno et al. ........................... 73/505
5,226,324  7/1993  Oikawa et al. ......................... 73/505

FOREIGN PATENT DOCUMENTS 64-16911  1/1989  Japan .

*Primary Examiner*—Richard Chilcot
*Assistant Examiner*—Max H. Noori
*Attorney, Agent, or Firm*—Nikaido, Marmelstein, Murray & Oram

[57] ABSTRACT

A vibrating gyroscope includes a vibrating body which is formed into, for example, a square loop. A section of the vibrating body is formed into, for example, a square. Driving piezoelectric elements are formed on upper and lower faces of one piece of the vibrating body. Detecting piezoelectric elements are formed on outer and inner side faces of a piece of the vibrating body whereon the driving piezoelectric element is formed. On a piece adjoining the piece whereon the driving piezoelectric element is formed, the detecting piezoelectric elements are formed. By applying a signal to the driving piezoelectric elements, the vibrating body is subjected to bending vibration, and by measuring an output voltage of the detecting piezoelectric elements, a rotational angular velocity is detected.

7 Claims, 6 Drawing Sheets

F I G. 4
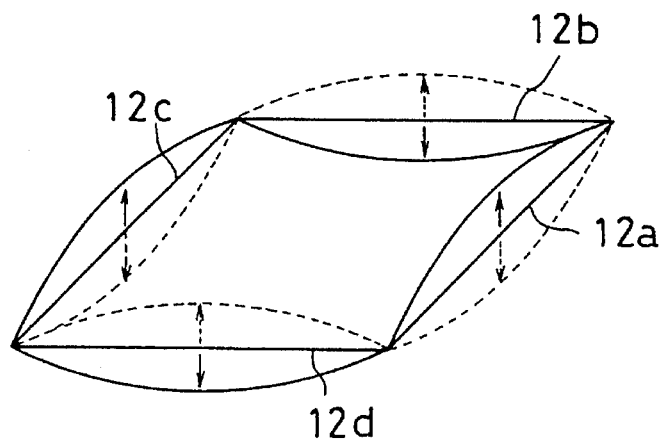
F I G. 5
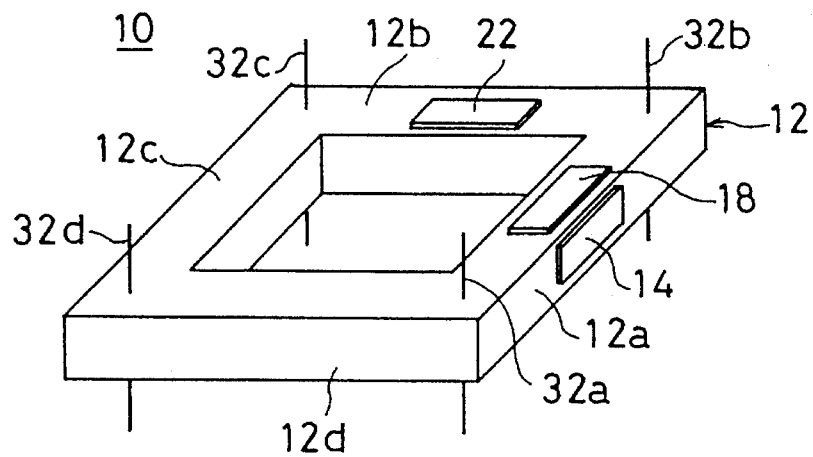
F I G. 6
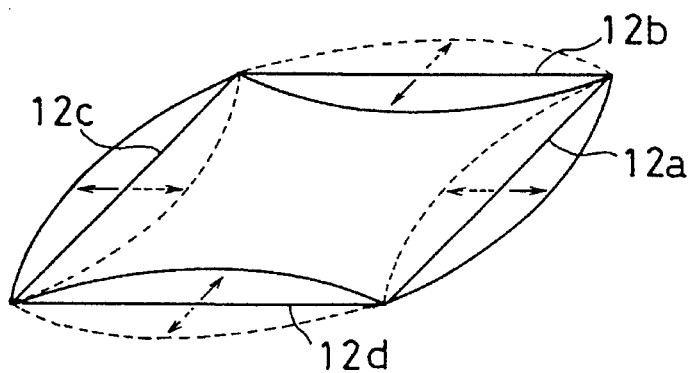

VIBRATING GYROSCOPE

BACKGROUND OF THE INVENTION

1. Field of the Invention

The present invention relates to a vibrating gyroscope, and particularly, to a vibrating gyroscope for measuring a rotational angular velocity in two or more directions.

2. Description of the Prior Art

Conventionally, for measuring a rotational angular velocity in two or more directions by a vibrating gyroscope, as shown in FIG. 15, those provided with two vibrating gyroscopes 2 and 3 in a case 1 were used. The vibrating gyroscopes 2 and 3 are so disposed that their center axes intersect at right angles with each other. Thus, the rotational angular velocity about the center axes of the vibrating gyroscopes 2 and 3 can be measured.

However, when the two vibrating gyroscopes are disposed in the case, due to the difference of their vibrating frequencies, interference by a sound wave or those by vibration through the case are produced. Since a power source is usually used in common to drive the two vibrating gyroscopes, voltage interference is produced.

SUMMARY OF THE INVENTION

It is, therefore, a primary object of the present invention to provide a vibrating gyroscope which does not produce vibration interference or voltage interference, and is able to measure a rotational angular velocity about axes in a plural number of directions.

The present invention is directed to the vibrating gyroscope comprising a vibrating body having a plural number of axial directions, a driving piezoelectric element for giving bending vibration to the vibrating body, and detecting piezoelectric elements formed along the axial directions of the vibrating body, and disposed so as not to intersect at right angles with a vibrating direction at non-rotation of the vibrating body.

Since the vibrating body has the plural number of axial directions, when a portion of the vibrating body is driven, the entire vibrating body having the plural number of axial directions are subjected to bending vibration. When the vibrating body is rotated about the center axes, a vibrating direction is changed due to a Coriolis force, and the voltage is generated in the detecting piezoelectric elements disposed so as not to intersect at right angles with the vibrating direction at non-rotation. Since the detecting piezoelectric elements are formed along the plural number of axial directions, the voltage is generated in the detecting piezoelectric elements responsive to the rotational angular velocity about the axes.

According to the present invention, by measuring an output voltage of the detecting piezoelectric element, the rotational angular velocity can be detected. Since the detecting piezoelectric elements are formed along the plural number of axial directions, the rotational angular velocity about the axes can be detected. Since the entire vibrating body are subjected to bending vibration by driving a portion of the vibrating body, vibration interference produced by the difference of vibrating frequencies can be prevented. Since only a portion of the vibrating body is driven, the common power source is not necessary as in the case of driving the plural number of vibrating bodies, thus the voltage interference can be prevented.

The above and other objects, features, aspects and advantages of the present invention will become more apparent from the following detailed description of the embodiment made with reference to the drawings.

BRIEF DESCRIPTION OF THE DRAWINGS

FIG. 4 is an illustrative view showing a vibrating state of a vibrating gyroscope shown in FIG. 1.

FIG. 5 is a perspective view showing a modified example of a vibrating gyroscope shown in FIG. 1.

FIG. 6 is an illustrative view showing a vibrating state of a vibrating gyroscope shown in FIG. 5.

DESCRIPTION OF THE PREFERRED EMBODIMENTS

Figure 1:
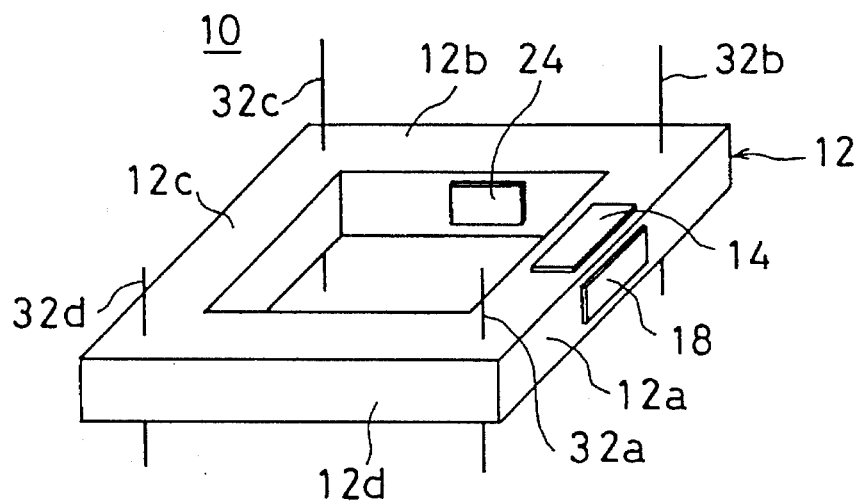
FIG. 1 is a perspective view showing one embodiment of the present invention.
Figure 2:
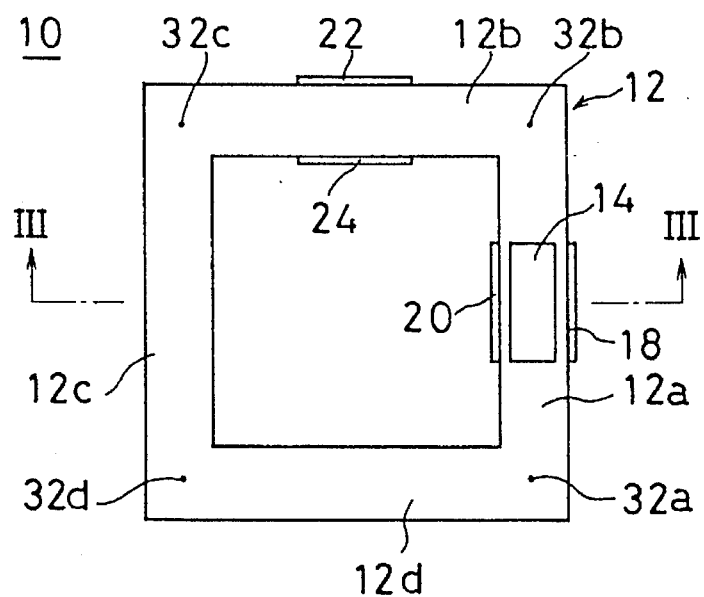
FIG. 2 is a plan view of a vibrating gyroscope shown in FIG. 1.
Figure 3:
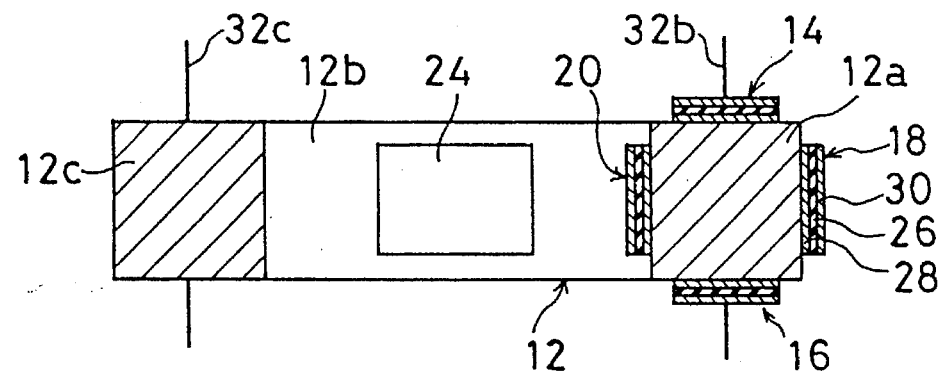
FIG. 3 is a sectional view taken along a line III—III of FIG. 2.

FIG. 1 is a perspective view showing one embodiment of the present invention, FIG. 2 is a plan view and FIG. 3 is a sectional view taken along a line III—III of FIG. 2. A vibrating gyroscope 10 includes a vibrating body 12. The vibrating body 12 is consisting of a material which produces a generally mechanical vibration such as elinver, iron-nickel alloy, quartz, glass, crystal, ceramics and the like. The vibrating body 12 is formed into, for example, a square loop. A section of the vibrating body 12 has a square shape. Thus, center axes of respective pieces 12a, 12b, 12c and 12d of the vibrating body 12 are formed so as to intersect at right angles with the respective adjoining center axes.

Driving piezoelectric elements 14 and 16 are formed on the side 12a of the vibrating body 12. The driving piezoelectric elements 14 and 16 are formed on upper and lower faces of the vibrating body 12. Detecting piezoelectric elements 18 and 20 are formed on the piece 12a of the vibrating body 12. The detecting piezoelectric element 18 is formed on an outer side face of the vibrating body 12, and the detecting piezoelectric element 20 is formed on an inner side face thereof. Separate detecting piezoelectric elements 22 and 24 are formed on the piece 12b adjoining the piece 12a of the vibrating body 12. The detecting piezoelectric elements 22 is formed on an outer side face of the vibrating body 12, and the detecting piezoelectric element 24 is formed on an inner side face thereof. The piezoelectric elements used for driving and detection are constituted by forming electrodes 28 and 30 on both faces of a piezoelectric layer 26 such as a piezoelectric ceramic. The electrode 28 of the piezoelectric element is bonded to the vibrating body 12 by means of adhesives and the like.

Support members 32a, 32b, 32c and 32d formed by a metal wire and the like are fixed to the vibrating body 12. The support members 32a–32d are fixed to the vibrating body 12 in the vicinity of nodal points thereof. The nodal points of the vibrating body 12 are present at intersecting points of the center axes of the pieces 12a–12d. The support members 32a–32d are fixed to the vibrating body 12 at upper and lower positions corresponding to the nodal points thereof. As a method of fixing the support members 32a–32d, for example, welding or soldering may be used, or may be extending through the vibrating body 12 so as to pass the nodal points.

In the vibrating gyroscope 10, the vibrating body 12 is excited by connecting an exciting circuit to the driving piezoelectric elements 14 and 16. In this case, as shown by solid lines in FIG. 4, when the pieces 12a and 12c bend upward, the pieces 12b and 12d bend downward. Conversely, as shown by dotted lines in FIG. 4, when the pieces 12a and 12c bend downward, the pieces 12b and 12d bend upward.

In this state, the voltage is not generated in the detecting piezoelectric elements 18, 20 and the detecting piezoelectric elements 22, 24. When the vibrating body 12 rotates about the axis of the piece 12a, a vibrating direction of the piece 12a changes due to a Coriolis force. Hence, the detecting piezoelectric elements 18 and 20 bend in a facial direction, and the voltage responsive to the rotational angular velocity is generated. By measuring the voltage of the detecting piezoelectric elements 18 and 20, the rotational angular velocity about the axis of the piece 12a of the vibrating body 12 can be detected. Similarly, when the vibrating body 12 rotates about the axis of the piece 12b, the voltage responsive to the rotational angular velocity is generated in the detecting piezoelectric elements 22 and 24. By measuring the voltage of the detecting piezoelectric elements 22 and 24, the rotational angular velocity about the axis of the piece 12b of the vibrating body 12 can be detected.

By using the vibrating gyroscope 10, the rotational angular velocity about the axes in two directions can be detected. In the vibrating gyroscope 10, the entire vibrating body 12 is subjected to bending vibration by the driving piezoelectric elements 14 and 16. Hence, interference due to sound propagation and the interference of vibration through the case are not produced, as in the case of disposing two vibrating gyroscopes in the case. Since only one driving circuit is adopted, the power source is not necessary to be used in common, thus voltage interference is not produced. Since only one driving circuit is adopted, the circuit can be simplified as compared with the case of driving the two vibrating gyroscopes.

In the vibrating gyroscope 10, since the pieces among the pieces 12a–12d of the vibrating body 12 adjoining with each other are formed to intersect at right angles, positioning is simple as compared with the case where the two vibrating gyroscopes are disposed in the case at right angles. When the vibrating body 12 is formed into a loop other than the square, the rotational angular velocity about two axes which are not intersecting at right angles can be detected. As such, a shape of the vibrating body 12 can be changed responsive to the direction of the rotational angular velocity to be detected.

The vibrating body 12 can be excited by either of the driving piezoelectric elements 14, or 16. The rotational angular velocity can be detected by either of the detecting piezoelectric elements 18, 20, or by either of the detecting piezoelectric elements 22, 24. The driving piezoelectric element or the detecting piezoelectric element may be formed on the other pieces 12c, 12d of the vibrating body 12. In this case, the driving piezoelectric element is formed on the upper and lower faces of the vibrating body 12, and the detecting piezoelectric element is formed on the outer and inner side faces of the vibrating body 12. That is, one or more driving piezoelectric elements are required, and one or more detecting piezoelectric elements are required respectively on two pieces which are at right angles with each other.

As shown in FIG. 5, the driving piezoelectric elements 14 and 16 may be formed on the outer and inner side faces of the vibrating body 12. In this case, the detecting piezoelectric elements 18 and 20 are formed on the upper and lower faces of the piece 12a of the vibrating body 12, and the detecting piezoelectric elements 22 and 24 are formed on the upper and lower faces of the piece 12b of the vibrating body 12. In the vibrating gyroscope 10, as shown in FIG. 6, the vibrating body 12 is subjected to bending vibration in the outer circumferential direction and in the inner circumferential direction of the vibrating body 12. Even by using such vibrating gyroscope 10, the rotational angular velocity about two axes which are at right angles with each other can be detected.

Figure 7:
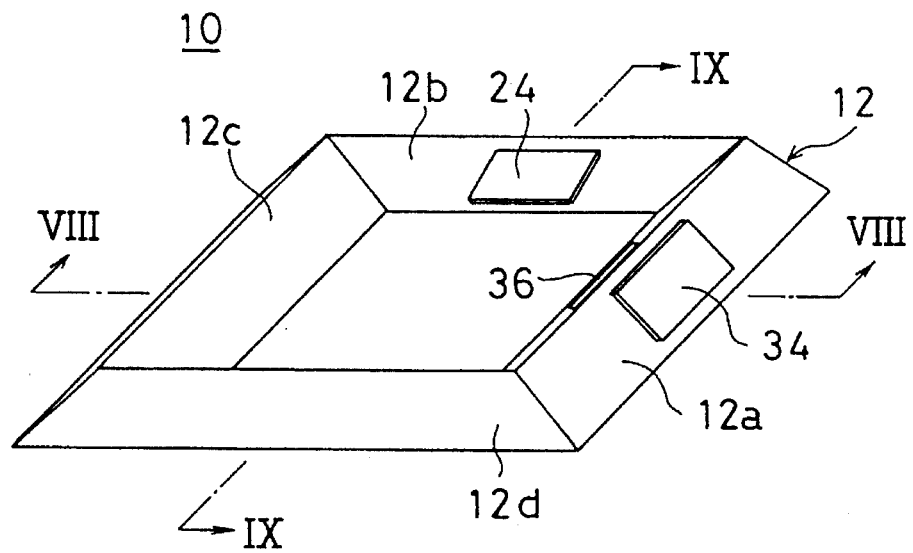
FIG. 7 is a perspective view showing another embodiment of the present invention.
Figure 8:
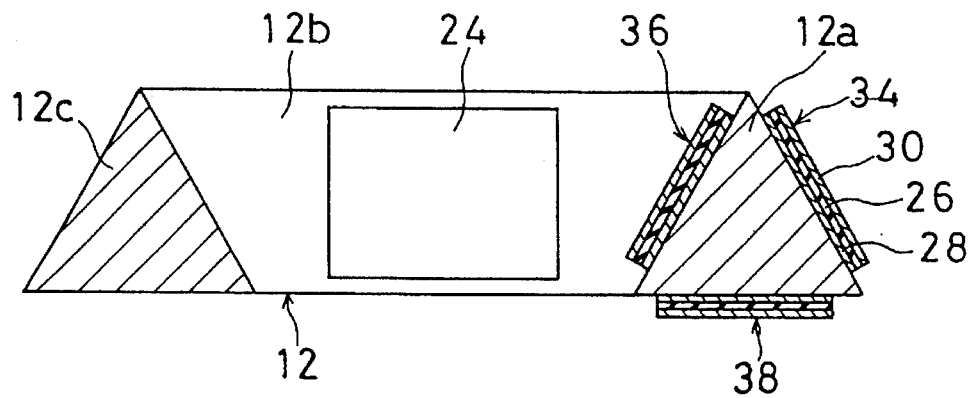
FIG. 8 is a sectional view taken along a line VIII—VIII of FIG. 7.
Figure 9:
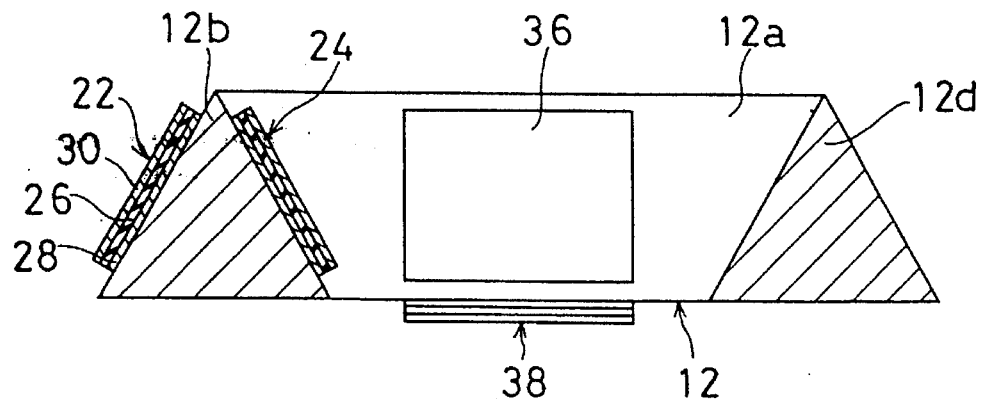
FIG. 9 is a sectional view taken along a line IX—IX of FIG. 7.

As a shape of the vibrating body 12, a sectional triangular shape as shown in FIGS. 7, 8 and 9 may be adopted. In this vibrating gyroscope 10, piezoelectric elements 34, 36 and 38 are formed respectively on three side faces of the piece 12a. The two piezoelectric elements 34 and 36 are commonly used for driving and detection, and the other piezoelectric element 38 is used for feedback. By connecting an exciting circuit between the piezoelectric elements 34, 36 and the piezoelectric element 38, the vibrating body 12 is subjected to bending vibration as shown in FIG. 4. The detecting piezoelectric elements 22 and 24 are formed on two side faces which are symmetrical to the direction of bending vibration of the piece 12b of the vibrating body 12.

In the vibrating gyroscope 10, intensities of voltages generated in the piezoelectric elements 34 and 36 at non-rotation are equal. Thus, when measuring the difference of voltages of the piezoelectric elements 34 and 36, it is offset one another and becomes zero. When the vibrating body 12 rotates about the axis of the piece 12a, the vibrating direction changes due to the Coriolis force, and the voltage generated, for example, in the piezoelectric element 34 becomes larger, and the voltage generated in the piezoelectric element 36 becomes smaller. Thus, by measuring the difference of output voltages of the piezoelectric element 34 and the piezoelectric element 36, the larger output than the vibrating gyroscope shown in FIG. 1 can be obtained. Hence, a fine rotational angular velocity can be detected. Similarly, by measuring the difference of output voltages of the detecting piezoelectric elements 22 and 24, the rotational angular velocity about the axis of the piece 12b of the vibrating body 12 can be detected.

In the embodiment shown in FIG. 7, though the exciting circuit is connected between the piezoelectric elements 34, 36 and the piezoelectric element 38, the latter is not always necessary. In this case, by applying a driving signal to the piezoelectric elements 34 and 36 to excite the vibrating body 12, and measuring the output voltage difference of the same piezoelectric elements 34 and 36, the rotational angular velocity can be detected.

Figure 10:
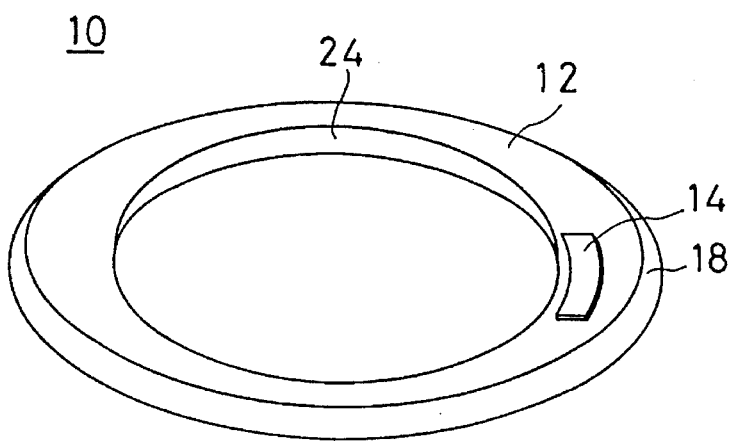
FIG. 10 is a perspective view showing still another example of the present invention.
Figure 11:
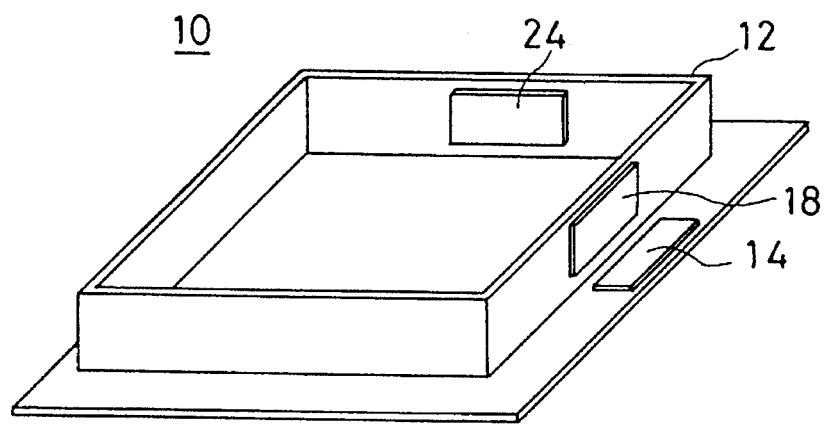
FIG. 11 is a perspective view showing a separate example of the present invention.
Figure 12:
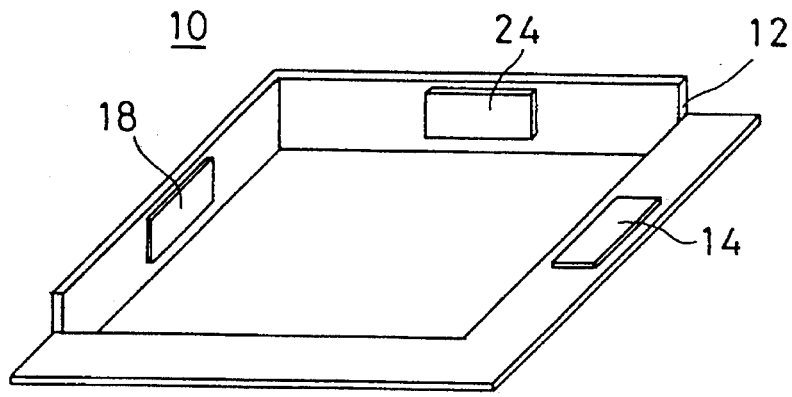
FIG. 12 is a perspective view showing a still separate example of the present invention.

As a shape of the vibrating body 12, those formed into an annular shape having a circular section as shown in FIG. 10 may also be adopted. In this case, piezoelectric elements can also be disposed as shown in FIG. 1 or FIG. 5. As shown in FIG. 11, the vibrating body 12 having an L-shaped section may also be used. Also, as shown in FIG. 12, plate materials may be combined into a shape such that, faces whereon the driving piezoelectric elements 14, 16 are formed, and faces whereon the detecting piezoelectric elements 18, 20 and 22, 24 are formed intersect one another at right angles.

Figure 13:
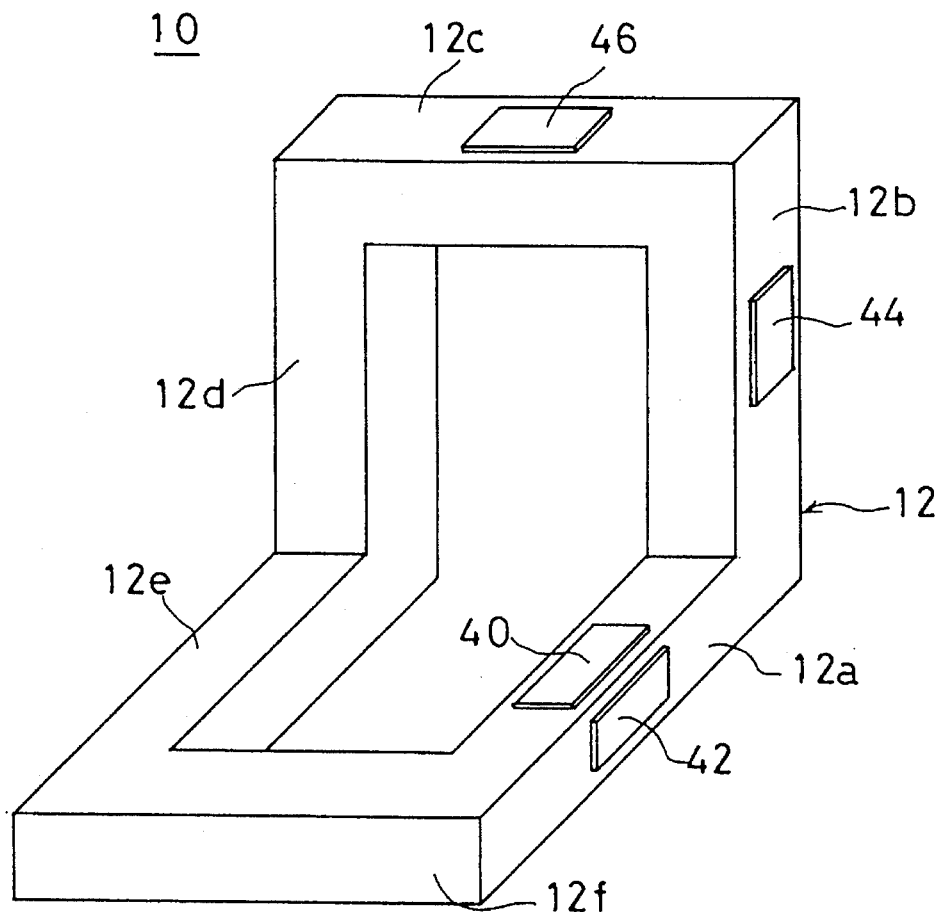
FIG. 13 is a perspective view showing an example of a vibrating gyroscope capable of detecting a rotational angular velocity about axes in three directions.
Figure 14:
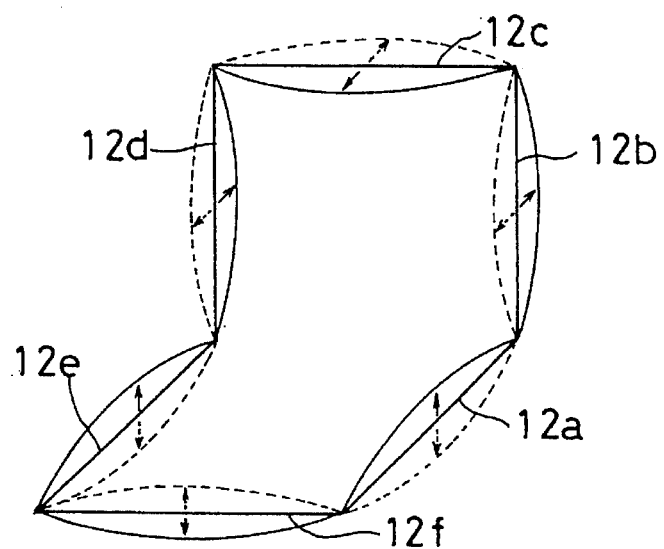
FIG. 14 is an illustrative view showing a vibrating state of a vibrating gyroscope shown in FIG. 13.
Figure 15:
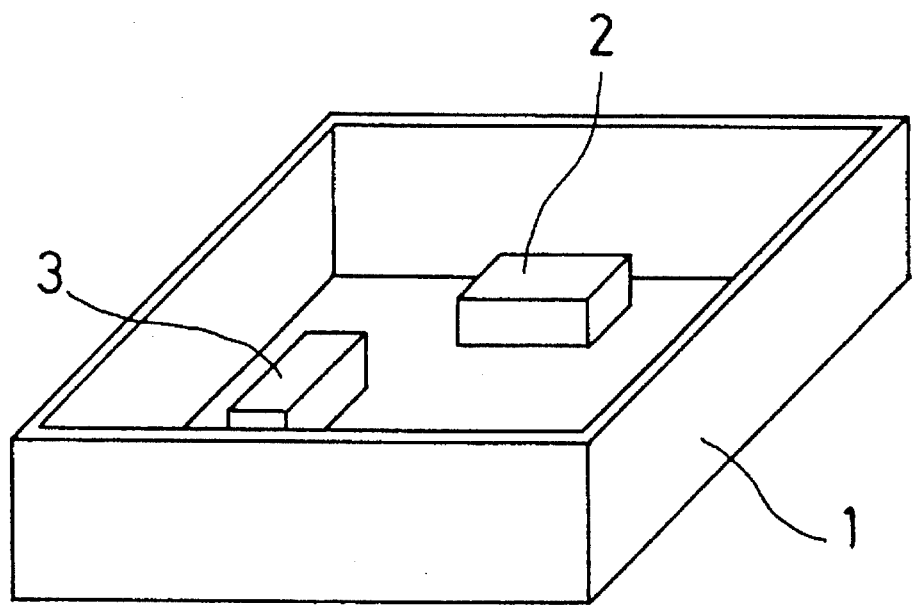
FIG. 15 is an illustrative view showing an example of a conventional vibrating gyroscope which is a background of the present invention.

As shown in FIG. 13, the vibrating body 12 may be formed into a shape, where the pieces 12a and 12b combined into an L-shape and the pieces 12d and 12e combined into the L-shape, are connected by the pieces 12c and 12f. In this vibrating gyroscope 10, a driving piezoelectric element 40 is formed on the upper face of the piece 12a. It is to be understood that, the driving piezoelectric element may also be formed on the lower face of the piece 12a of the vibrating body 12. By connecting the exciting circuit to the driving piezoelectric element 40, the vibrating body 12 is subjected to bending vibration in such a manner that the adjoining sides are in opposite directions as shown in FIG. 14. On the pieces 12a, 12b and 12c of the vibrating body 12, detecting piezoelectric elements 42, 44 and 46 are formed on the faces which do not intersect at right angles with the direction of bending vibration at non-rotation. It is to be understood that, separate detecting piezoelectric elements may also be formed on faces on the opposite side of the faces whereon the detecting piezoelectric elements 42, 44 and 46 are formed.

In the vibrating gyroscope 10, since the pieces 12a, 12b and 12c are intersecting with each other at right angles, the rotational angular velocity about three axes which are at right angles with each other can be detected. Thus, from these rotational angular velocities, the rotation in every directions can be detected.

According to the present invention, a plural number of rotational angular velocities can be detected, and vibration interference and voltage interference of the power source can be prevented. Since an axial direction to be detected is decided by the shape of the vibrating body, positioning is simple as compared with the case of disposing the separate vibrating gyroscopes in a predetermined positional relationship.

While the present invention has been particularly described and shown, it is to be understood that such description is used merely as an illustration and example rather than limitation, and the spirit and scope of the present invention is determined solely by the terms of the appended claims.

What is claimed is:

1. A vibrating gyroscope comprising:
    a vibrating body including a plural number of axial directions wherein said vibrating body is formed into a loop;
    a driving piezoelectric element for giving bending vibration to said vibrating body; and
    detecting piezoelectric elements formed along the plural number of axial directions of said vibrating body, and disposed so as not to intersect at right angles with a vibrating direction at non-rotation of said vibrating body.

2. A vibrating gyroscope in accordance with claim 1, wherein said vibrating body is formed into a square loop having a square section, said driving piezoelectric element is formed on, at least, either of upper and lower faces of said vibrating body, and said detecting piezoelectric elements are formed on, at least, either of outer and inner faces of said vibrating body.

3. A vibrating gyroscope in accordance with claim 1, wherein said vibrating body is formed into a square loop having a square section, said driving piezoelectric element is formed on, at least, either of outer and inner side faces of said vibrating body, and said detecting piezoelectric elements are formed on, at least, either of upper and lower faces of said vibrating body.

4. A vibrating gyroscope in accordance with claim 1, wherein said vibrating body is formed into a square loop having a triangular section, detecting piezoelectric elements are formed on respective two side faces of one piece and another piece of said vibrating body, and the detecting piezoelectric elements formed on two side faces of one piece of said vibrating body serve also as said driving piezoelectric element.

5. A vibrating gyroscope in accordance with claim 1, wherein said vibrating body is formed into a square loop having an L-shaped section, said driving piezoelectric element is formed on, at least, either of upper and lower faces of said vibrating body, and said detecting piezoelectric elements are formed on, at least, either of outer and inner side faces of said vibrating body.

6. A vibrating gyroscope in accordance with claim 1, wherein said vibrating body is formed into a square loop, and respective pieces of said vibrating body are formed into plates having faces which intersect at opposite angle portions of said loop, and said driving piezoelectric element and said detecting piezoelectric elements are respectively formed on the intersecting faces of said vibrating body.

7. A vibrating gyroscope comprising:
    a vibrating body including a plural number of axial directions;
    a driving piezoelectric element for giving bending vibration to said vibrating body; and
    detecting piezoelectric elements formed along the plural number of axial directions of said vibrating body; and disposed so as not to intersect at right angles with a vibrating direction at non-rotation of said vibrating body, wherein said vibrating body is formed into a shape where end portions of two opposite L-shaped pieces are connected, said detecting piezoelectric elements are formed on three pieces of said vibrating body extending in different directions, and said driving piezoelectric element is formed on a face intersecting with said detecting piezoelectric elements forming faces of said vibrating body.

* * * * *